(12) United States Patent
Laing (10) Patent No.: US 6,915,943 B2
(45) Date of Patent: Jul. 12, 2005

(54) TETHERLESS INTERNAL LINE-UP UNIT FOR PIPELINE WELDING

(75) Inventor: Brian Scott Laing, Houston, TX (US)

(73) Assignee: CRC-Evans Pipeline International, Inc., Houston, TX (US)

(*) Notice: Subject to any disclaimer, the term of this patent is extended or adjusted under 35 U.S.C. 154(b) by 316 days.

(21) Appl. No.: 10/306,143

(22) Filed: Nov. 27, 2002

(65) Prior Publication Data

US 2004/0099713 A1 May 27, 2004

(51) Int. Cl.[7] .................. B23K 5/22; B23K 37/00; B23K 37/04
(52) U.S. Cl. ............... 228/212; 228/44.3; 228/44.5; 228/47.1; 228/49.1; 228/49.3; 72/125; 72/297; 72/314
(58) Field of Search .................. 228/212, 44.3, 228/44.5, 47.1, 49.1, 49.3; 72/31.01, 125, 297, 314, 466

(56) References Cited

U.S. PATENT DOCUMENTS

| 3,765,665 A | | 10/1973 | Work ..................... 2619/27 |
| 3,851,519 A | * | 12/1974 | Calvin et al. .............. 72/466 |
| 4,929,124 A | * | 5/1990 | Lockwood ............... 405/165 |
| 5,013,376 A | * | 5/1991 | McElroy et al. ............. 156/64 |
| 5,059,765 A | | 10/1991 | Laing ................ 219/125.11 |
| 5,288,005 A | | 2/1994 | Beakley et al. .......... 228/49.3 |
| 5,356,067 A | | 10/1994 | Leduc ................... 228/44.5 |
| 5,535,938 A | | 7/1996 | Leduc .................... 228/212 |
| 5,651,638 A | | 7/1997 | Heggerud ............... 405/154 |
| 5,796,069 A | | 8/1998 | Jones et al. ......... 219/121.64 |
| 5,954,143 A | * | 9/1999 | McCabe et al. .......... 173/184 |
| 6,092,406 A | * | 7/2000 | Rajagopalan et al. ..... 72/31.01 |
| 6,212,748 B1 | * | 4/2001 | Porter et al. ............ 29/281.5 |

FOREIGN PATENT DOCUMENTS

EP          0 706 849 A1    2/1994

* cited by examiner

Primary Examiner—Lynne R. Edmondson
(74) Attorney, Agent, or Firm—Sidley Austin Brown & Wood LLP (57) ABSTRACT

A line-up clamp unit is powered by a diesel engine which drives a hydraulic pump for operating hydraulic equipment in the unit. The unit includes a line-up clamp which has front shoes, rear shoes and expanding copper back-up tiles. Drive wheels are deployed by a hydraulic cylinder and operated by a hydraulic drive motor. A group of aligning assemblies are electrically operated and fiction to extend L-shaped members to beyond the diameter of the pipe being welded so that the unit can be automatically positioned at the end of a pipe section. A control box includes a radio receiver for receiving control signals and producing corresponding electric control commands for operating the line-tip unit. A remote control radio transmitter has operating, mechanisms, including push buttons and toggle switches, for operating the line-up unit, including the engine, drive motor, brakes, line-up clamp and aligners.

20 Claims, 5 Drawing Sheets

TETHERLESS INTERNAL LINE-UP UNIT FOR PIPELINE WELDING

TECHNICAL FIELD OF THE INVENTION

The present invention pertains in general to the welding of pipe for use as pipelines and in particular to the alignment of pipe ends for welding.

BACKGROUND OF THE INVENTION

Pipelines, which extend for many miles, are constructed by welding together sections of pipe. The welding together of the pipe ends is a major aspect in the cost and time required for the construction of the pipeline. In order for welding equipment to be applied to weld the pipe sections, the ends of the pipes must be accurately aligned with each other and held rigidly in position where the welding takes place. One way of holding the pipe sections in position is by use of an internal line-up clamp. Internal line-up clamps are shown in U.S. Pat. No. 5,356,067 and U.S. Pat. No. 5,535,938. A self-powered internal line-up clamp and internal welding apparatus is described in U.S. Pat. No. 5,059,765. These line-up clamps require the use of a reach rod or tether line for moving and positioning the line-up clamp at the abutting ends of the pipe sections and this rod or line must be passed through each new pipe section.

A bending mandrel is a device that is positioned within a section of pipe so that the pipe section can be subjected to outside forces and bent to a desired configuration. The mandrel prevents the pipe wall from collapsing during the bending process and producing an uneven or distorted pipeline wall. Such a pipeline mandrel that includes an apparatus for remote control positioning is shown in U.S. Pat. No. 6,092,406. A positioning apparatus for use with pipeline equipment is shown in U.S. Pat. No. 5,651,638. It has heretofore been known to use a diesel engine mounted to a pipe mandrel for providing motive and other operational power to the mandrel.

Due to the substantial time and effort required to move and then accurately position an internal line-up clamp, there exists a need for a line-up clamp unit that is self-powered so that it can be moved through pipeline segments and then be positioned accurately without the need to repeatedly position a rod or tether line that is used for controlling and moving the clamp unit.

SUMMARY OF THE INVENTION

One embodiment of the present invention is an internal line-up clamp unit which is used for the welding of pipe sections in the building of a pipeline. The unit includes a frame with an internal combustion engine mounted to the frame. A hydraulic pump is connected to be driven by the engine. A group of solenoid hydraulic valves are connected to the hydraulic pump. A set of wheels are mounted to the frame for supporting the unit when the unit is positioned inside a pipe. A hydraulic drive motor is connected to be operated by one of the solenoid valves. At least one drive wheel is mounted to the frame and connected to be driven by the hydraulic drive motor under control of a solenoid valve. A hydraulic actuator is connected to extend and retract the drive wheels, is hydraulically connected to the hydraulic pump and is controlled by a solenoid valve. A brake mechanism including a hydraulic actuator is connected to the hydraulic pump and controlled by a solenoid valve. A line-up clamp is provided as a part of the unit and includes a set of extendable front shoes, a set of extendable back shoes and a set of extendable back-up plates, the line-up clamp including a hydraulic actuator connected to a solenoid for extending and retracting the front shoes and back-up tiles and a hydraulic actuator connected to a solenoid for extending and retracting the rear shoes. A portable, remote control radio transceiver has control mechanisms, such as buttons and switches, for operating the engine, the drive motor, the drive wheel actuator, the brake mechanism, the front shoes and the back-up plates and the rear shoes. The remote control transceiver transmits control signals in response to actuation of the control mechanisms. A control box is mounted to the clamp unit and has a radio transceiver that receives the control signals from the remote control radio transceiver. In response to the control signals, the control box produces electrical control signals for operating the solenoids for the hydraulic actuators.

A further aspect is an aligner assembly mounted adjacent the line-up clamp and having one or more actuators for extending and retracting a plurality of alignment members. The aligner assembly is controlled by the remote control transceiver and the control box.

A still further aspect is the inclusion of detectors or switches for determining the position of moveable components in the line-up control unit and indicating these positions at the remote control transceiver.

BRIEF DESCRIPTION OF THE DRAWINGS

For a more complete understanding of the present invention, reference is now made to the following detailed description taken in conjunction with the drawings in which.

DETAILED DESCRIPTION

Figure 1:
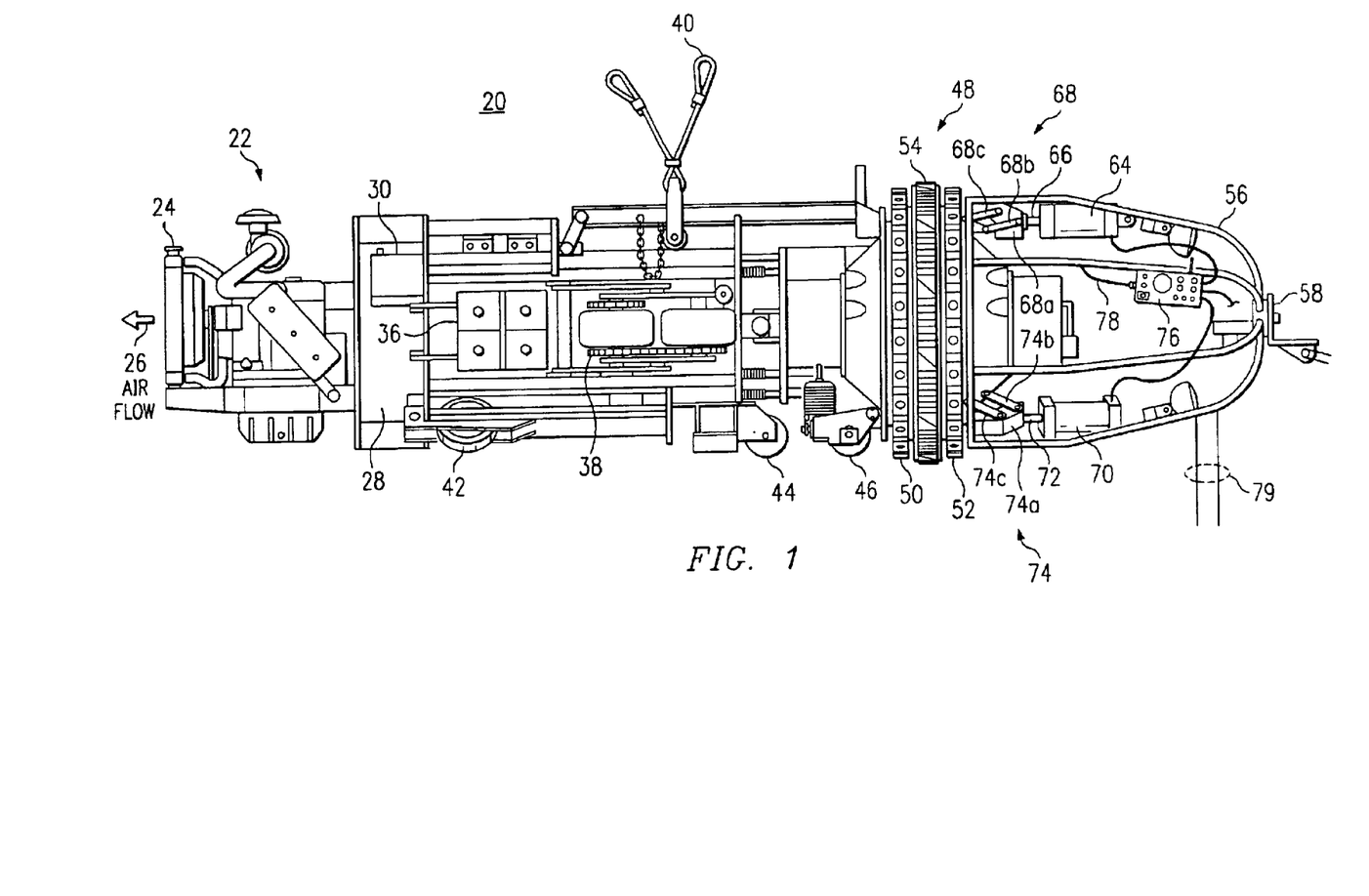
FIG. 1 is an elevation view of a line-up unit in accordance with the present invention.

A tetherless line-up clamp unit 20 in accordance with the present invention is shown in FIG. 1. The line-up unit 20 is powered by an engine 22, which is preferably a diesel engine. The engine 22 includes a radiator 24 having a fan which produces an air flow in the direction of arrow 26. The engine 22 powers a hydraulic pump (shown in FIG. 2) which is positioned within a housing 28. A battery 30 provides electrical power for the line-up unit 20 as well as a source of starting energy for the engine 22. Engine 22 includes an alternator for charging the battery 30. The unit 20 has a frame that supports the various components of the unit 20. Engine 22 is mounted to the frame of unit 20.

The line-up unit 20 is provided with an extendable brake 36 which can engage the interior of a pipe to hold the unit 20 in a fixed location. The unit 20 further includes a set of drive wheels 38 which are operated by a hydraulic drive motor (shown in FIG. 2), for moving the unit 20 within a section of pipe. The unit 20 is lifted and transported by means of a lifting hook 40 that is attached to the frame of the unit 20. The unit 20 is supported within a pipe section by wheels 42, 44 and 46. Wheels 42 and 46 provide the primary support. A corresponding set of three wheels (not shown) are located on the far side of the unit 20 illustrated in FIG. 1.

The line-up unit 20 includes a line-up clamp 48 that includes rear shoes 50 and front shoes 52. The clamp 48 further includes extendable back-up tiles 54 which can be made of various materials, for example, copper. A line-up clamp applicable for use with the present invention is described in U.S. Pat. No. 5,535,938 entitled "Internal Line Up Clamp" which issued Jul. 16, 1996. This patent (U.S. Pat. No. 5,535,938) is incorporated herein by reference. The line-up clamp 48 includes a first hydraulic actuator for positioning the rear shoes 50 (extended or retracted) and a second hydraulic actuator for simultaneously positioning (extended or retracted) the front shoes 52 and tiles 54. These two actuators are located within the clamp 48.

The line-up unit 20 is further provided with a nose cone 56 which is a part of the frame. The nose cone 56 comprises a plurality of tubular members which extend forward of the line-up clamp 48 and meet at a common support junction 58.

An electric actuator 64 is mounted on the interior of the nose cone 56 and includes a movable rod 66 that is connected to an aligner 68, which includes an L-shaped member 68a and parallel rods 68b and 68c which are pivotally connected to the member 68a at one end and to a fixed frame member at the opposite end. The member 68a moves along an arc as limited by the rods 68b and 68c. The rod 66 drives the aligner 68 to extend the member 68a radially outward and to retract the member 68a to an inward, storage position. The rods 68b and 68c pivot about the fixed ends thereof. The movable member 68a extends radially outward for engaging the end of a section of pipe when the unit 20 is moved back into a pipe section.

An electric actuator 70 includes a moveable rod 72 that is connected to an aligner 74 which likewise has an L-shaped member 74a and parallel rods 74b and 74c that are pivotally connected at one end thereof to the member 74a and to a fixed frame at the opposite ends. Aligner 74 operates in the same manner as the aligner 68 described above. There is a third aligner and related electric actuator (not shown) so that the total of three aligners are located at 120° positions along the periphery of the unit 20. Although an electric drive assembly is described for operating the aligners, a hydraulic drive could alternatively be used with corresponding solenoids for control of the drives. The aligners 68 and 74 can be set to different lateral positions (along the lengthwise dimension of the pipe) to thereby position the back-up tiles at different lateral positions under the junction of the pipes for the purpose of evening the wear on the tiles. The aligners can improve the welding process, but are not a necessary part of the present invention.

The line-up unit 20 further includes a control box 76 which is connected via a multi-line cable 78 to control solenoid valves in the unit 20 and through other cables to the aligner actuators 64 and 70. The control box 76 is a transceiver, that is, it includes a transmitter and a receiver.

A pair of "whisker" rods 79 are connected to respective switches mounted to the nose cone 56 for indicating when the nose cone 56 has extended through the open end of a pipe section. The rods 79 swing downward when the nose cone 56 exits from a pipe section.

Figure 2:
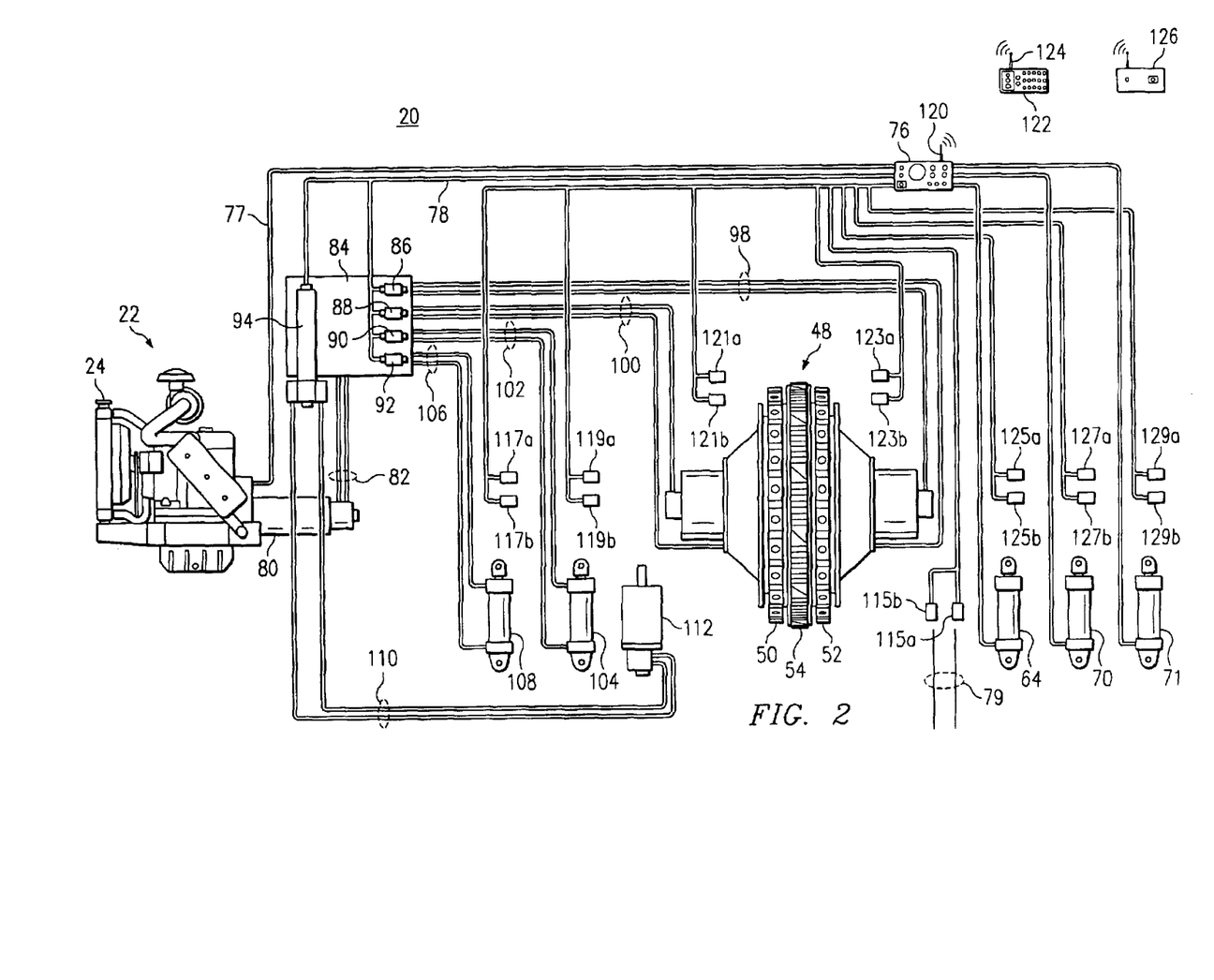
FIG. 2 is a schematic illustration of operative components of the line-up unit and the interconnection of these components.

Referring to FIG. 2, there is shown a group of operative components which are used in conjunction with the present invention and the specific interconnection of these components. The engine 22 of the unit 20 is connected to drive a hydraulic pump 80 which is mounted within the housing 28. The pump 80 drives hydraulic fluid through lines 82 to a manifold 84. A set of solenoid valves 86, 88, 90, 92 and 94 are mounted on the manifold 84. Cable 78 is provided with five sets of electrical lines that are connected respectively to the solenoid valves 86, 88, 90, 92 and 94. The cable 78 is routed through the line-up clamp 48.

The solenoid valve 86 is connected to hydraulic lines 98 which are connected to the hydraulic actuator for the front shoes 52 and back-up tiles 54. The solenoid valve 88 is connected through hydraulic lines 100 to the hydraulic actuator for operating the rear shoes 50. The solenoid valve 90 is connected through hydraulic lines 102 to a hydraulic cylinder 104 which functions to extend and retract the drive wheels 38. Solenoid valve 92 is connected through hydraulic lines 106 to a hydraulic cylinder 108 that operates the brake 36 of the line-up unit 20. Solenoid valve 94 is connected through hydraulic lines 110 to a hydraulic drive motor 112 that powers the drive wheels 38 of the line-up unit 20.

The actuators 64 and 70 together with a third drive assembly 71 are connected through respective electric cables to the control box 76.

The control box 76, which is connected to the cable 78, is mounted on the nose cone 56 to permit an operator to manually control the line-up unit 20 when the operator is in close proximity to the line-up unit 20. The control box 76 includes a radio transceiver that has an antenna 120. A remote control 122 includes a transceiver with an antenna 124 and this unit permits an operator to move and control the line-up unit 20 from a remote location by transmitting commands from the remote control 122 to the control box 76 by radio signals. The control box 76 is described in further detail in FIG. 3 and the remote control 122 is described in further detail in FIG. 4. The remote control 122 and control box 76 utilize transceivers (transmitters and receivers) so that commands can be sent from the remote control 122 to the control box 76 for operating the various components of the unit 20. Many of these components include corresponding sensors or detectors to determine when a particular commanded operation has been performed. This information is conveyed to the control box 76 and is then transmitted back to the remote control 122 for activating specific lights to indicate when particular operations have actually been accomplished. This is further described in reference to FIG. 4. This feedback of information allows the operator, at a remote location, to know when a commanded operation has been performed. This not only enhances the operational capabilities of the unit 20, but provides substantial safety because the operator knows when a commanded action has been completed.

The control box 76 is coupled by a cable 77 to the engine 22 for starting and stopping the engine 22.

The transceivers in the control box 76 and the remote control 122 can communicate directly with each other or optionally can be configured to communicate through a transponder 126. The control box 76 will be located within a section of pipe and it may be necessary for the remote control unit 122 to be positioned at some point away from the pipe, such as due to adverse terrain or weather conditions. The transponder 126 can be positioned at the open end of a pipe section such that it has essentially line-of-sight bi-directional transmission paths to both the control box 76 and the remote control 122. The transponder 126 can be located in any position where it can communicate with both the control box 76 and the remote control 122. The reliability and consistency of communication between the remote control 122 and control box 76 can be improved by use of the transponder 126.

In order to indicate to an operator using the remote control unit 122 when a commanded operation has actually been completed, the unit 20 is provided with proximity detectors or switches for indicating particular positions of components which can be moved from one position to another. Such detectors or switches can be, for example, physical contact switches, magnetic switches or Hall effect sensors. Hydraulic cylinder 108 has associated with it proximity switches 117a and 117b. Proximity switch 117a is activated when the brake 36 is in the retracted position and switch 117b is activated when the brake 36 is in the extended position. Switches 117a and 117b are connected to the control box 76. The hydraulic cylinder 104 functions to extend and retract the drive wheels 38. A proximity switch 119a indicates when the drive wheels are in the retracted position and a proximity switch 119b is activated when the drive wheels are in the extended position. These switches are electrically connected to the control box 76.

Proximity switches 121a and 121b are used to indicate respectively when the rear shoes 50 are in the retracted and extended positions. Proximity switches 123a and 123b indicate respectively when the front shoes 52 and the back-up tiles 54 are in the retracted and extended positions.

The whisker rods 79 are connected to or mounted near respective proximity switches 115a and 115b which are activated when the rods are essentially in the vertical position.

The actuator 64, which operates an aligner assembly, works in conjunction with proximity switches 125a and 125b to indicate respectively when the aligner is retracted and extended. Actuator 70 works in conjunction with proximity switches 127a and 127b to indicate when the corresponding aligner is in the retracted and extended positions.

The third actuator 71 and aligner have corresponding proximity switches 129a and 129b to indicate respectively when the actuator and aligner are in the retracted and extended positions. In place of the proximity switches, the component positions can be determined by measuring pressure in hydraulic lines.

Figure 3:
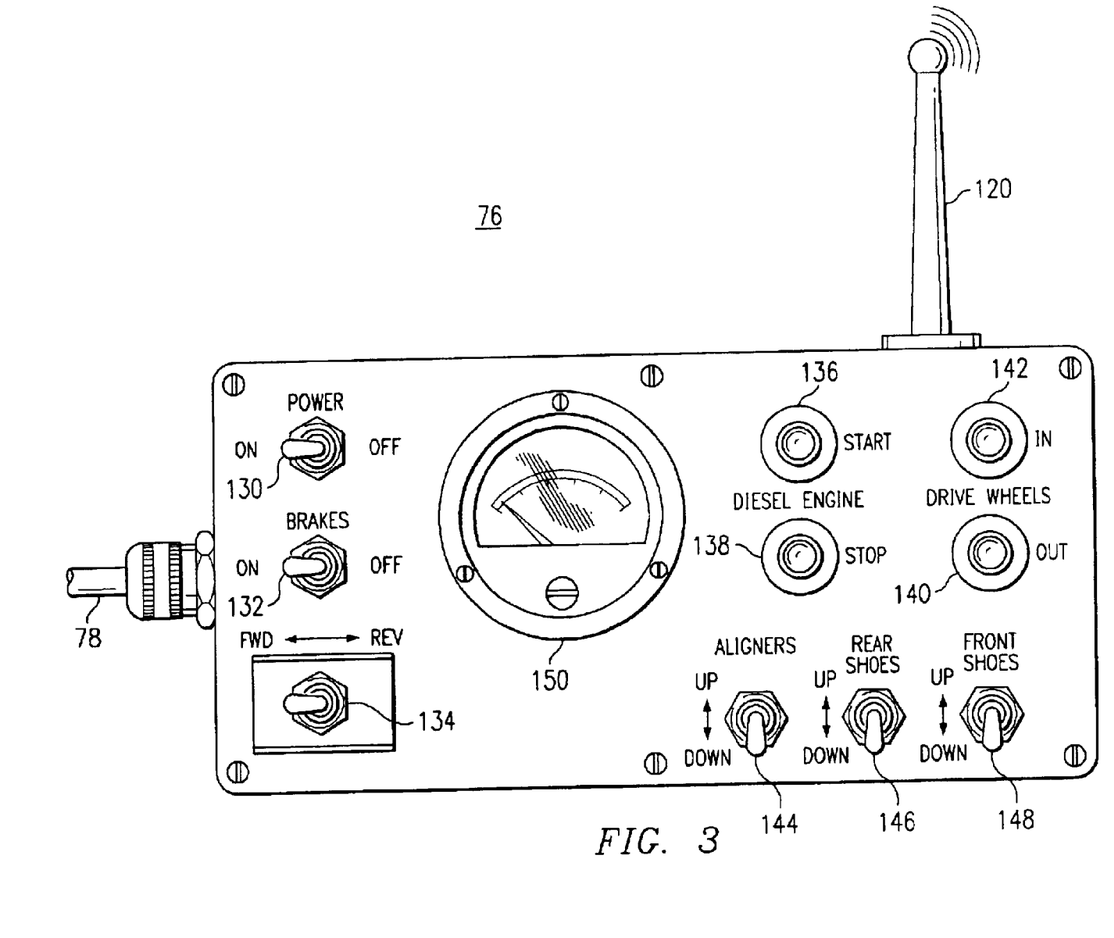
FIG. 3 is a front view of a line-up unit control box in accordance with the present invention.

The control box 76 is shown in FIG. 3. The control box 76 is activated by a power switch 130. The brake 36 of the line-up unit 20 is operated by a toggle switch 132. When the brake switch is in the "OFF" position, the line-up unit 20 can be moved through the pipe, but when the brake switch is in the "ON" position, the line-up unit 20 is held in a fixed position by the brake. Toggle switch 134 has a neutral center position, but when pressed toward the left (the forward position), moves the line-up unit 20 forward in the pipe, toward the opening, and when pressed to the reverse position, causes the line-up unit 20 to move backward through the pipe. The diesel engine 22 is activated by pressing a start button 136 and deactivated by pressing a stop button 138.

The drive wheels 38 are moved outward to engage the interior of the pipe surface when button 140 is pressed and are moved away from the pipe interior surface to a retracted, non-engaged position when button 142 is pressed. The aligner members 68a and 74a, and a corresponding third member, are extended radially outward when switch 144 is set to the "UP" position and these members are retracted when the toggle switch 144 is set to the "DOWN" position The rear shoes 50 are engaged to the interior of the pipe when a switch 146 is set to the "UP" position and are moved out of engagement with the interior surface of the pipe when the switch 146 is set to the "DOWN" position. The front shoes 52 are engaged with the interior of the pipe when a switch 148 is set to the "UP" position and are moved away from, that is retracted, when the switch 148 is set to the "DOWN" position.

The electrical system voltage for the line-up unit 20 is measured by a voltmeter 150.

Figure 4:
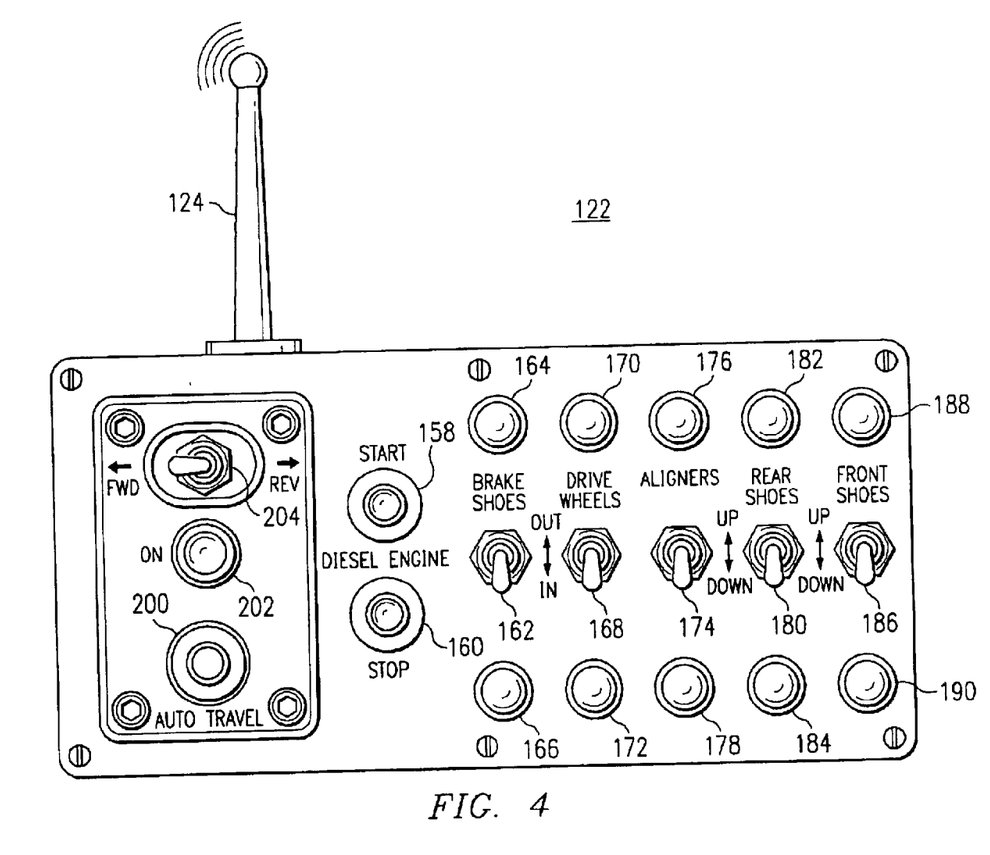
FIG. 4 is a front view of a line-up unit remote control box in accordance with the present invention.

The remote control 122 is further described in reference to FIG. 4. When the remote control 122 is in use, it provides substantially the same operational capabilities that are provided by the control box 76. The remote control 122 includes a set of indicator lights (a visual display) for showing the actual position of moveable components of the unit 20. The diesel engine 22 is started by depressing a "START" button 158 and is stopped by pressing a "STOP" button 160. The brake 36 is operated by a command produced by a toggle switch 162. When the toggle switch 162 is set to the "OUT" position, a command is sent from the remote control 122 to the control box 76 which produces a signal for operating the solenoid to engage the brake. If the brake shoes are correctly engaged to the interior surface of the pipe, a light 64 is turned on. When the switch 162 is set to the "IN" position, a command is transmitted to retract the brake and if this is done, a light 166 is activated to indicate that the brakes have been retracted. The lights 164 and 166 are activated respectively in response to the proximity switches 117b and 117a which respond to the position of the brake 36.

The drive wheels 38 are engaged to the interior surface of the pipe when a toggle switch 168 is positioned to the "OUT" position and at the same time a light 170 is activated by switch 119b to indicate that the drive wheels are engaged. When the switch 168 is moved to the "IN" position, the drive wheels 38 are retracted and this condition is indicated by a light 172 which responds to switch 119a.

The aligner members 68a and 74a (see FIG. 1) are driven to the extended position when the toggle switch 174 is set to the "UP" position and a light 176 is turned on by switches 125b, 127b and 129b. When the toggle switch 174 is set to the "DOWN" position, the aligners are retracted and a light 178 is turned on by switches 125a, 127a and 129a.

The rear shoes 50 are driven into engagement with the interior of the pipe section when a toggle switch 180 is placed in the "UP" position. When this occurs, a light 182 is activated by switch 121b. When switch 180 is set to the "DOWN" position, the rear shoes are retracted and a light 184 is turned on by switch 121a. The front shoes 52 and back-up tiles 54 are engaged with the interior of the pipe section when a switch 186 is moved to the "UP" position and this results in the operation of the light 188 by switch 123b. When switch 186 is set to the "DOWN" position, the front shoes and backup tiles are retracted and a light 190 is turned on by switch 123a.

The line-up unit 20 is commanded to automatically travel and detect the end of the pipe by pressing a button 200. This automatic travel state is indicated to be in operation when a light 202 is activated. The toggle switch 204 is used to manually position the line-up unit 20 within pipe. When the switch 204 is moved to the forward (FWD) position, the line-up unit 20 moves forward in the pipe, which is toward the next pipe section to be welded to the pipeline. When the toggle switch 204 is moved to the reverse (REV) position, the line-up unit 20 moves in the direction of arrow 26 away from the opening of the pipe.

Conventional and well known radio remote control transmitters and receivers can be used in the present invention. One radio remote control which can be utilized in the present invention is shown in U.S. Pat. No. 6,092,406 which describes a pipe mandrel that is moved to specific locations in a pipe before the pipe is bent to a required shape. U.S. Pat. No. 6,092,406, which is entitled "PIPELINE MANDREL POSITIONING CONTROL SYSTEM" and which issued Jul. 25, 2000 is incorporated herein by reference. A further radio transmission and receiving system for use with pipeline equipment, which could be implemented as a part of the present invention, is shown in U.S. Pat. No. 5,651,638 entitled "METHOD AND APPARATUS FOR CONTROLLING THE POSITION AND OPERATION OF EQUIPMENT WITHIN A PIPELINE" and which issued Jul. 29, 1997 is incorporated herein by reference.

The buttons and switches on the remote control 122 can produce a digital code for each unique command and these digital codes can be transmitted to the receiver in the control box 76 where a decoder recognizes each code and a corresponding control signal is produced. A selected transceiver for use with the present invention is a digital spread spectrum radio such as manufactured by FreeWave Technologies, Inc., having an address of 1880 S. Flatiron Court Sts., Boulder, Colo. 80301. This radio functions as a digital spread spectrum (DSS) modem. A still further transceiver which can be utilized with the present invention is a Model WIT 2400 Wireless Industrial Transceiver, manufactured by Cirronet, Inc., having an address of 5375 Oakbrook Parkway, Norcross, Ga. 30093.

Figure 5:
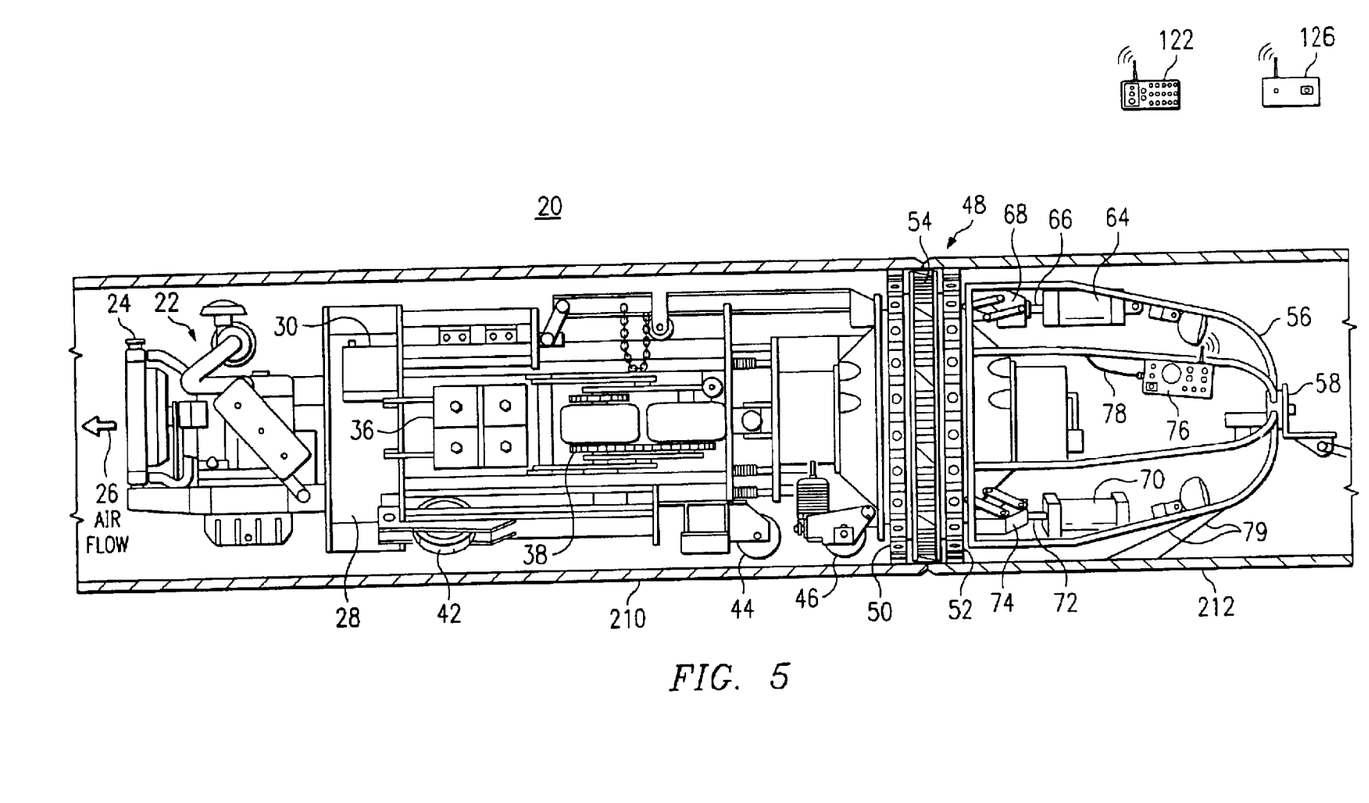
FIG. 5 is an illustration of the line-up unit of the present invention positioned in pipe sections for providing pipe alignment and welding backup.

FIG. 5 illustrates the operation of the line-up unit 20 as it is positioned within a group of pipe sections 210 and 212. The purpose of the line-up clamp 20 is to provide an accurate alignment between the abutting ends of the pipe sections 210 and 212 so that an external weld can be made on the abutting ends of these pipe sections with the tiles 54 providing back-up to the welding. When the process of welding the end of the pipe section 210 at its left end is completed, as shown in the drawing, the pipe section 212 is not yet in the position shown in FIG. 5, but is staged a short distance away awaiting use. The unit 20 is commanded to move forward toward the open end, the right end as shown in FIG. 5, of the pipe section 210 by operation of the remote control 122. This can be done by pressing the auto travel button 200 shown in FIG. 4 or moving switch 204 to the forward position. As the unit 20 travels forward, the whisker rods 79 are deflected against the interior surface of the pipe section 210. When the whisker rods 79 on the nose cone 56 pass through the right end opening of the pipe section 210, the whisker rods 79 deflect to a vertical position thereby indicating through the switches 115a and 115b connected thereto that the nose cone 56 has exited the end of the pipe section 210. This causes the automatic application of the brake 36 to stop the unit 20. Note that pipe section 212 has not yet been placed in the position shown in FIG. 5. The operator using the remote control 122 then moves the toggle switch 174 (FIG. 4) to the up position to extend the aligner members 68a and 74a so that the radially extended members of the aligners extend outside of the periphery of the pipe section 210. The operator then releases the brake 36 and moves the toggle switch 204 (FIG. 4) to the reverse direction such that the unit 20 begins to travel in the reverse direction thereby entering back into pipe section 210. This continues until the extended aligner members engage the end of the pipe section 210 thereby stopping the unit 20. The operator then uses remote control 122 to engage the brake 36 by operating toggle switch 162. The operator then activates the rear shoes 50 to engage the interior of the pipe section by moving the toggle switch 180 to the up position. The aligner members are then retracted by moving toggle switch 174 to the down position.

Pipe section 212 is then moved into the position shown in FIG. 5. Next, the operator uses remote control 122 to engage the front shoes by operation of toggle switch 186, which also causes the back-up tiles to be engaged to the junction between the pipe sections 210 and 212. The line-up clamp 48 is thus positioned to enable an external weld to be made at the abutting ends of the pipe sections 210 and 212. After the external welding operation is completed, the front and rear shoes are retracted together with the back-up tiles, the brake of the unit 20 is released, and the unit 20 is moved forward through pipe section 212 to repeat the process for the next pipe section to be welded to the pipeline.

The process of operating the line-up equipment as described is significantly faster than the previous process which requires threading a reach rod or cable through each pipe section before it can be welded in place. It also allows the operator to work from an enclosed work station which is protected from adverse weather.

Although one embodiment of the invention has been illustrated in the accompanying drawings and described in the foregoing Detailed Description, it must be understood that the invention is not limited to the embodiment disclosed but is capable of numerous rearrangements, modifications and substitutions without departing from the scope of the invention.

I claim:

1. An internal line-up clamp unit for use in the welding of pipe sections in the fabrication of a pipeline, comprising:
    a frame,
    an internal combustion engine mounted to said frame,
    a hydraulic pump coupled to said engine,
    a hydraulic manifold coupled to said hydraulic pump and coupled to a corresponding electrically operated hydraulic control unit,
    a line-up clamp mounted to said frame, wherein said line-up clamp is coupled to said hydraulic manifold and is hydraulically powered,
    drive and brake mechanisms hydraulically connected to said hydraulic manifold,
    a control box mounted to said unit and including a radio receiver, said control box connected to operate said hydraulic control unit, and
    a remote control transmitter having a plurality of control mechanisms which, when activated, produce control signals that are sent to said radio receiver in said control box for respectively operating said line-up clamp and said drive and brake mechanisms through said hydraulic control unit.

2. An internal line-up clamp unit as recited in claim 1 wherein said control box includes a set of mechanisms to produce control signals for operating said engine, said line-up clamp and said drive and brake mechanisms.

3. An internal line-up clamp unit as recited in claim 1 including:
    a set of aligners mounted on said frame, said aligners controlled by said control box, and
    said remote control transmitter having a mechanism operable for producing control signals that are sent to said radio receiver for operating said aligners.

4. An internal line-up clamp unit as recited in claim 1 wherein the unit includes a tubular nose cone and said control box is mounted to said nose cone.

5. An internal line-up clamp unit as recited in claim 1 wherein said engine is mounted at an end of said frame opposite said line-up clamp.

6. An internal line-up clamp unit as recited in claim 1 including a transponder for conveying said control signals from said remote control transmitter to said radio receiver.

7. An internal line-up clamp unit as recited in claim 1 including:
- a plurality of sensors for detecting positions of expandable shoes associated with said line-up clamp, said drive mechanism and said brake mechanism, and said sensors are coupled to said control box,
- a transmitter associated with said control box for transmitting position signals based on outputs of said sensors,
- a receiver associated with said remote control transmitter for receiving said position signals, and
- a visual display associated with said receiver and responsive to said received position signals.

8. An internal line-up clamp unit for use in the welding of pipe sections in the fabrication of a pipeline, comprising:
- a frame,
- an internal combustion engine mounted to said frame,
- a hydraulic pump driven by said engine,
- a plurality of solenoid valves having a hydraulic connection to said hydraulic pump,
- a set of wheels mounted to said frame for supporting said line-up unit when said line-up unit is positioned in a pipe,
- a hydraulic drive motor hydraulically coupled to a first of said solenoid valves,
- at least one drive wheel mounted to said frame and connected to be driven by said hydraulic drive motor via said first solenoid valve,
- a hydraulic actuator connected to extend and retract said drive wheel and hydraulically connected to said hydraulic pump via a second of said solenoid valves,
- a brake mechanism including a hydraulic actuator connected to said hydraulic pump via a third of said solenoid valves,
- an aligner assembly including one or more actuators for extending and retracting a plurality of alignment members,
- a line-up clamp having a set of extendable front shoes, a set of extendable back shoes and a set of extendable back up plates, said line-up clamp including a hydraulic actuator connected to a fourth of said solenoids for extending and retracting said front shoes and said back up plates and a hydraulic actuator connected to a fifth of said solenoids for extending and retracting said rear shoes,
- a portable, remote control radio transmitter having control mechanisms for operating said engine, said drive motor, said drive wheel actuator, said brake mechanism, said front shoes and said back-up plates, said rear shoes, said radio transmitter for transmitting control signals in response to actuation of said control mechanisms, and
- a control box mounted to said line-up clamp unit and having a radio receiver for receiving said control signals from said remote control radio transmitter and producing in response thereto electrical control signals for selectively operating said solenoids.

9. An internal line-up clamp as recited in claim 8 including an aligner assembly including one or more actuators for extending a retracting one or more alignment members, said remote control radio transmitter having a control mechanism for producing operating commands for said aligner assemblies and sending corresponding control signals to said control box radio receiver wherein said control box produces control signals for operating said aligner assemblies.

10. An internal line-up clamp unit as recited in claim 8 wherein said control box includes control mechanisms for said engine, said drive motor, said drive wheel actuator, said brake mechanism, said front shoes and said back-up plates, said rear shoes, and said aligners, and wherein said control box control mechanisms serve to produce signals to operate the corresponding solenoids and actuators.

11. An internal line-up clamp unit as recited in claim 8 wherein said frame includes a tubular nose cone and said control box is mounted on said nose cone.

12. An internal line-up clamp unit as recited in claim 8 wherein said engine is mounted on said frame at an end thereof opposite from said line-up clamp.

13. An internal line-up clamp unit as recited in claim 8 wherein said engine is a diesel engine.

14. An internal line-up clamp used as recited in claim 8 wherein said aligner actuators are electric actuators.

15. An internal line-up clamp unit as recited in claim 8 wherein said aligner assembly has three of said alignment members and three respective corresponding actuators.

16. An internal line-up clamp unit as recited in claim 8 wherein said remote control transmitter control mechanisms are push buttons and toggle switches.

17. A method for operating a line-up clamp unit in the fabrication of a pipeline, comprising the steps of:
- transmitting a group of radio frequency commands by operation of a plurality of input devices mounted to a portable remote control transmitter from the transmitter to a receiver mounted to said line-up clamp unit, which is positioned in a first pipe section, including:
  - producing a start command for starting an internal combustion engine which is coupled to propel and provide operating power to said line-up clamp unit,
  - producing a drive wheel engage command for causing one or more drive wheels of said line-up clamp unit to engage an interior surface of said first pipe section,
  - producing a forward travel command for causing a drive motor of said line-up clamp unit to move said line-up clamp unit forward in said first pipe section,
  - producing a brake engage signal for causing said brake of said line-up clamp unit to engage said interior surface of said first pipe section,
  - producing a rear shoe extend signal for causing a rear shoe assembly of said line-up clamp unit to engage said interior surface of said first pipe section, and
  - producing a front shoe and a back-up extend signal after a second pipe section has been positioned to abut said end of said first pipe section, thereby aligning abutting ends of said first and second pipe sections and providing backup for an external weld for joining said first and second pipe sections together.

18. A method for operating a line-up clamp unit as recited in claim 17 including further steps, which are performed after said external weld has been completed, comprising:
- producing commands to retract said rear shoes, said front shoes and said metal backup plates,
- producing a command to retract said brake of said line-up clamp unit, and
- producing said forward travel command for causing said drive motor of said line-up clamp unit to move said line-up clamp unit forward in said second pipe section.

19. A method for operating a line-up clamp unit as recited in claim 17 including the following steps produced at said remote control transmitter:
- producing an aligner extend command after said brake has engaged, producing a brake retract command after producing said aligner extend command, and producing a rear travel command after said aligner extend command to cause said line-up clamp to move rearward and until said aligner engages said open end of said first pipe section.

20. A method for operating a line-up clamp unit as recited in claim 17 including the steps of:

producing respective position signals for said drive wheel, said brake, said rear shoes and said front shoes, and providing said control signals to a transmitter in a control box associated with said receiver, transmitting position signals from said control box transmitter to a receiver associated with said remote control transmitter, and producing a visual display at said remote control transmitter in response to receiving said position signals for indicating positions of said drive wheels, said brake and said shoes of said line-up clamp.

* * * * *